May 24, 1938. E. E. STEWART Re. 20,740

METHOD OF TREATING HYDROCARBONS

Original Filed Nov. 6, 1926 2 Sheets-Sheet 1

INVENTOR.
Edward E. Stewart.
BY
ATTORNEY

May 24, 1938. E. E. STEWART Re. 20,740

METHOD OF TREATING HYDROCARBONS

Original Filed Nov. 6, 1926 2 Sheets-Sheet 2

INVENTOR
Edward E. Stewart.
BY
ATTORNEY

Reissued May 24, 1938

Re. 20,740

UNITED STATES PATENT OFFICE 20,740

METHOD OF TREATING HYDROCARBONS

Edward E. Stewart, deceased, late of Wichita Falls, Tex., by Universal Oil Products Company, assignee, Chicago, Ill., a corporation of Delaware Original No. 1,905,071, dated April 25, 1933, Serial No. 338,951, February 11, 1929, which is a division of application November 6, 1926, Serial No. 146,671. Application for reissue April 25, 1935, Serial No. 18,266

6 Claims. (Cl. 196—58)

My invention relates to methods for treating hydrocarbon oils for the purpose of separating and extracting the lighter from the heavier hydrocarbons, and particularly for effecting separation of natural gasolines without injury to their texture and/or for recovering additional gasoline by breaking down or cracking the heavier hydrocarbons, the principal object of the invention being to treat oils of different gravity and gasoline content according to their nature for producing a maximum yield of gasoline, this application being a division from my co-pending application, Serial No. 146,671, which has matured into Patent No. 1,798,338, March 31, 1931, wherein apparatus adapted to use the method was illustrated and described.

It is an established fact that light gravity liquids such as kerosene, light distillates, and gasoline contain more hydrogen than the heavier oils. It is also a well-known fact that less coke is formed in the cracking chamber when hydrogen is present therein in sufficient amounts; and that when hydrogen is deficient and particularly when charging stock that has been cracked is used, an excess amount of coke is deposited. It is, therefore, a particular object of my invention to provide a method of treating hydrocarbons whereby the objectionable coking effects may be obviated and particularly whereby hydrogen may be provided for in the stream of fluid subjected to the treatment to prevent the formation of an excess amount of coke, and a zero cold test fuel oil may be produced free from suspended coke and bottom settlings.

In accomplishing these and other objects of the invention, I have provided improved methods which will be described in selected aspects as used in the operation of my apparatus substantially as illustrated and described in the above mentioned co-pending application and illustrated in the accompanying drawings, wherein.

Figure 1:
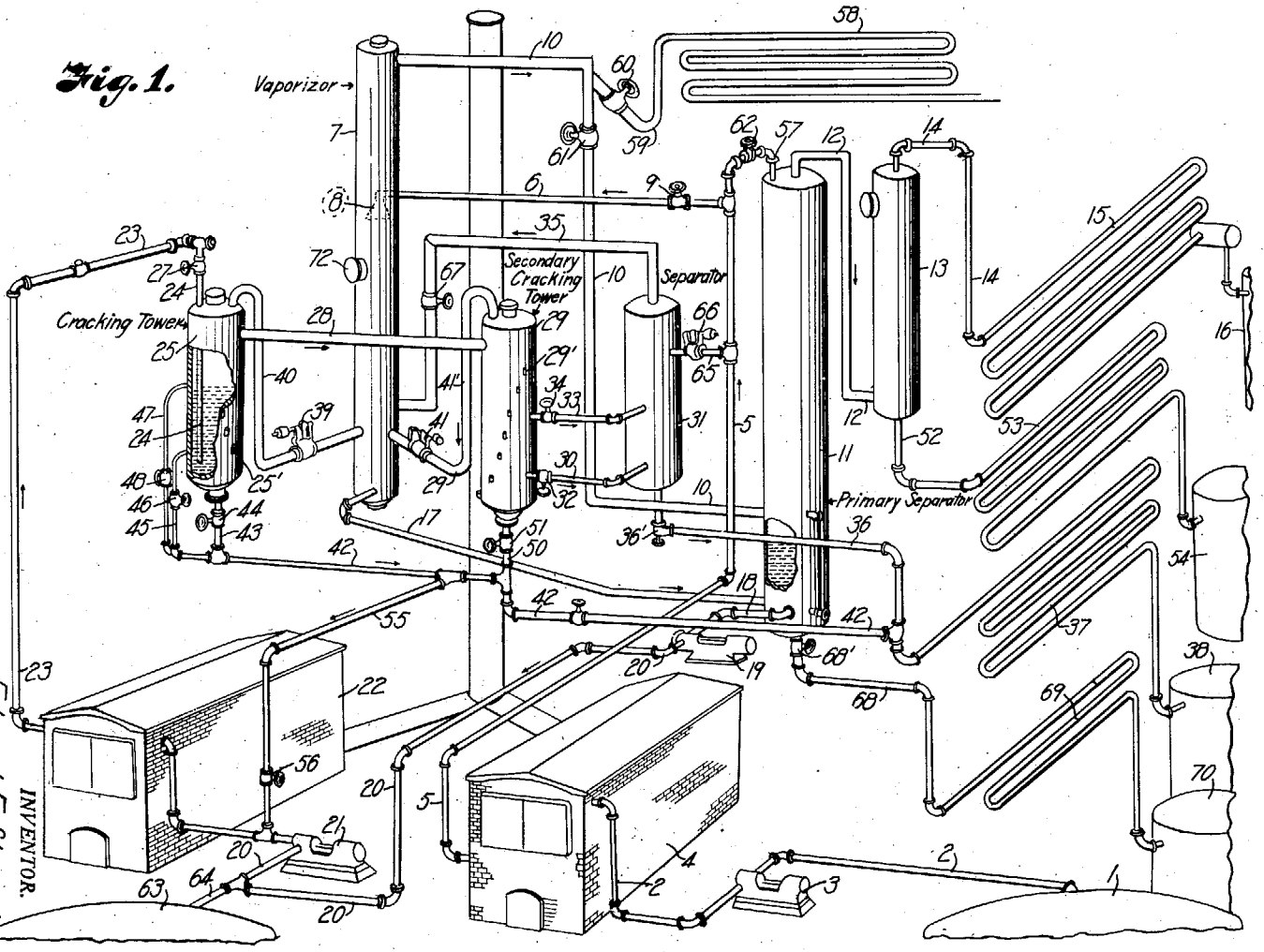
Figure 1 is a diagrammatic view of an oil refining and treating apparatus whereby my method may be employed, some of the parts being broken away for better illustration.
Figure 3:
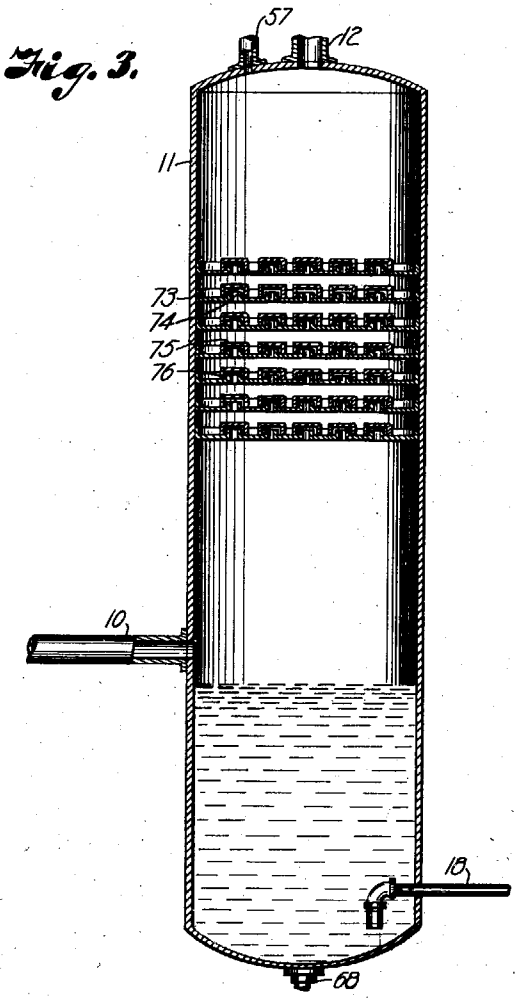
Figure 3 is an enlarged vertical section of the primary separator tower.
Figure 2:
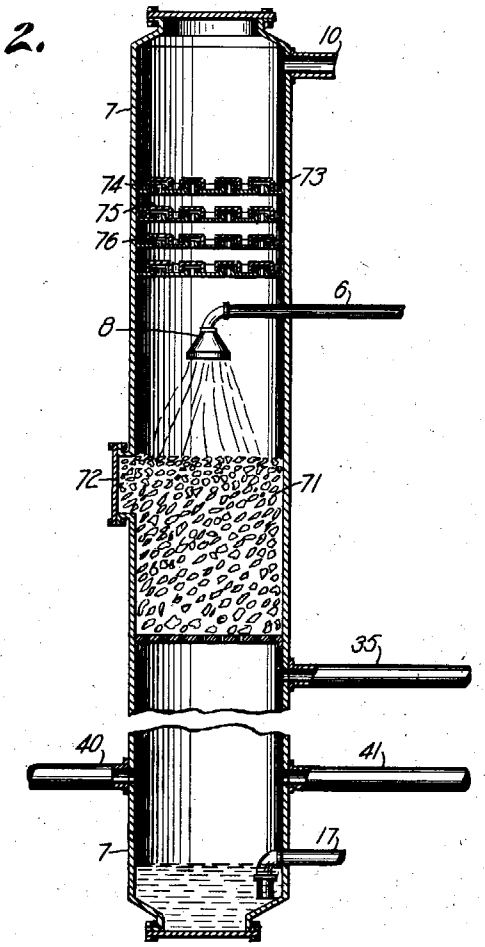
Figure 2 is an enlarged, longitudinal, sectional view of the bubble tower, wherein the initial separation of vapors is effected.

Referring more in detail to the drawings:

1 designates an ordinary storage tank constituting a source of supply of oil to be treated. Leading from the tank 1 is a line 2 whereby oil is drawn from the supply by a pump 3 and delivered under pressure into a charging still 4. The oil is heated in the still 4 to a temperature of about 500° F. and forced through a line 5 and branch 6 into the upper portion of a vaporizer or blending zone illustrated as a bubble tower 7, where it is delivered downwardly as a shower through a nozzle 8. The branch 6 carries a valve 9 for a purpose presently described.

When the apparatus is in operation and the vaporizer being supplied from the cracking still, as presently described, cracked vapors released in the vaporizer rise through the shower of liquid and, absorbing the lighter elements of the oil along with the water vapors, pass off from the top through a vapor line 10 to the primary separator tower 11, entering near the bottom of the tower. When the apparatus is in operation, cracked vapors enter the bottom and straight run vapors and liquid enter at the top of the vaporizer, forming a counter current of vapors and liquid, the cracked vapors rising through a liquid shower, a spreading element, and bubble plates, effecting absorption or commingling of the lighter with the heavier hydrocarbons, so that a large portion of the non-condensible vapors which are ordinarily lost are absorbed and carried over with the recovered vapors.

After passing through tower 11, the lighter vapors and non-condensible gases pass off through a vapor line 12, leading from the top of tower 11 to the bottom of a fractionating tower 13, the vapors passing through the fractionating tower being drawn off through a vapor line 14 into the condenser 15 and eventually into tank 16.

While the lighter components of the oil are passing to the condenser as described, heavier components collect as liquid in the bottom of the vaporizer and primary separator towers, the liquid from the vaporizer passing to the bottom of the separator through a back trap line 17, level of the liquid in the separator being normally as indicated in the drawings.

When the apparatus is employed for cracking, liquid is drawn from the bottom of the primary separator tower through a suction line 18, preferably by means of a hot oil pump 19, and forced through the line 20 to a second hot oil pump 21, which forces the oil through a cracking still 22, wherein the oil is heated to a temperature of approximately 890° F. and wherein a pressure of approximately 250 to 300 pounds is maintained. The force from the pump 21 carries the oil through the still and out through a transfer line 23 and a depending terminal 24 into the bottom of a primary cracking tower 25, the terminal 24 being provided with a hand valve 27. The tower 25 is provided with a number of petcocks 25' spaced vertically for the purpose of determining levels of contents of the tower. Oil entering the first cracking tower as liquid rises through the tower to an outlet line 28 at or near the top of the tower, through which the liquid is conducted to near the top of a second high pressure cracking tower 29, also provided with petcocks 29' as and for the purpose specified in connection with the first cracking tower.

The oil passes through the second cracking tower 29 in the form of vapor to a pressure relief line 30, opening to the tower near its lower end, through which the vapors are conducted to near the bottom of a secondary separator tower 31. The line 30 carries a hand valve 32. An emergency connection between the second cracking tower and the secondary separator tower is provided in the line 33, which leaves the tower 29 and enters the tower 31 at elevations above the line 30, the emergency line being also provided with a hand valve 34. The vapors entering the secondary separator tower expand, releasing the pressure in the circuit, the cracked components passing off from the top of the secondary separator through a vapor line 35 into the lower portion of the vaporizer 7, through which they rise, coming in contact with the initial charging vapors and oils or water vapors, as heretofore described. The heavier components (fuel oil) are drawn off from the bottom of the secondary separator tower through a tar line 36 and passed through a cooling coil 37 into a storage tank 38. The tar line 36 is valved as at 36' for controlling pressure and flow through said line.

Should excessive pressure be built up in the system, initial relief is afforded through a safety valve 39 in a line 40, leading from the top of the primary cracking tower 25 to the bottom of the vaporizer, this valve being set for operation at approximately 25 pounds above the normal system pressure.

A secondary relief is afforded through a valve 41 in a line 41', leading from the top of the secondary cracking tower 29 to near the bottom of the vaporizer, this second relief valve being preferably set at approximately 50 pounds above the normal pressure. Consequently, should the relatively small line 30 leading from the secondary cracking tower to the secondary separator be insufficient to carry off the content of the system with sufficient rapidity and excessive pressure be built up, the relief means which I have provided will operate and prevent damage to the apparatus or interruption of the treating process.

The primary cracking tower may be relieved at any time through a line 42, leading to the cooling coil 37. The line 42 communicates with the tower through a line 43 leading from the bottom of the tower and provided with a hand valve 44, through a line 45 leading from the side of the tower, slightly above the bottom and provided with a hand valve 46 or through a line 47, leading to a higher elevation in the tower and provided with a hand valve 48.

While treatment of oil with my apparatus reduces accumulation of coke to a minimum, there is, nevertheless, some accumulation in the cracking towers, and it is for this reason that I provide for drawing off of the oil from the towers at different elevations, the lower outlets being employed when there is a minimum accumulation in the towers and the upper outlets according to the depth of the coke. The secondary cracking tower may be drained into the line 42 through a branch 50, provided with a hand valve 51. The fractionating tower 13 may be drained through a line 52 and cooling coil 53 into a storage tank 54.

Should it be desirable to drain the still, as in the event of burning out a tube, the relief may be effected through a line 55, connecting the line leading from the pump 21 to the still with the line 42 leading to the cooling coil 37. The line 55 is provided with a hand valve 56, which is normally closed but, when opened, will permit flow of liquid under the still pressure back through the cooling coil to rapidly relieve the still of the fluid and its pressure, the cooing coil reducing the temperature of the liquid so that by the time the latter reaches the storage tank, it is below the flashing point, thereby obviating the danger incident to release of the oil into atmosphere under the usual still temperature.

The method of operation of recovering gasoline from crude oil described in connection with the description of apparatus contemplates the collection of the straight run and cracked gasoline in the same condenser. Should it be desirable to separate the straight run and the cracked gasoline, this may be effected by closing the valve 9 in the line 6 leading from line 5 to the vaporizer and conducting the vapors initially delivered to the system through a line 57 into the top of the separator 11. The straight run gasoline vapors are then carried off through the line 12 to the condenser as originally described, the heavier components collecting as liquid in the bottom of the separator and afterwards being drawn off through the charging still for cracking.

By a modification of the method, I separate the straight run and cracked vapors by directing the cracked vapors into a separate condenser 58 connected with the line 10 through a branch 59 having a hand valve 60. For the operation of separately collecting the straight run and cracked gasoline, the valve 9 in line 6 and a valve 61 in line 10 are closed, and the valve 62 in line 57 and valve 60 in line 59 are opened. When all of the gasoline is to be collected together, the valve 62 in line 57 and the valve 60 in line 59 are closed, and valves 9 and 61 are opened to properly direct the flow.

It is desirable to maintain a proper volume of circulating fluid in the system at all times during operation of the apparatus. Should the accumulation in the separator 11 fall below a desirable level, fresh crude oil may be supplied from a tank 63 connected with the pump 19 through a pipe 20 leading to pump 21 through a branch 64. The branch 64 is normally closed by the ordinary tank valve (not shown).

As a modification of the mode of operation heretofore described, I provide additional elimination of coke by passing the crude oil through the charging still at a higher temperature and pressure, such as 800° F. and 100 pounds pressure, thereby eliminating all heavy fuel oils, cokes and tars, passing only gas oils and wax distillates to the extreme cracking zone.

Under this mode of operation, the hot liquid under high pressure is passed initially to the secondary separator tower 31 through a line 65, provided with an automatic control valve 66 set to hold the desired pressure in the still, the valves 9 and 62 in the line 5 and branch 57 being closed when the system is so operated. The liquid passing to the secondary separator tower separates into vapor and heavy liquid, the vapors constituting approximately 85% of the whole and passing out through pipe 35 into the vaporizer, the fuel oil from initial charging stock being drawn off from the secondary separator and fuel oil from the cracking zone being drawn off through the bottom of the secondary separator and cooling coil into the tank 38. The vapors passing into the vaporizer are partially condensed, the lighter components passing on to the separator 11 where further condensation takes place, the gasoline vapors eventually reaching the condenser, and liquid condensed in the separator 11 and in the vaporizer accumulating in the bottom of the separator and being pumped through the cracking still in accordance with the operation first described.

When the method is to be employed only for skimming or re-running of cracked distillates as when the cracking still is under repair or shut down for cleaning out, the hand valve 67 in the line 35 leading from the secondary separator to the vaporizer is closed and liquid from the charging still delivered through the shower into the vaporizer, the vapors passing off to condensation and the heavier components back-trapping in the bottom of the separator tower 11 and being drawn off through a back-trap line 68 controlled by a valve 68' and through a cooling coil 69 into a storage tank 70.

In a preferred form of apparatus for using the method, a spreader bed 71 is provided in the vaporizer below the shower nozzle 8, which may be supplied and emptied through a manhole 72, and a series of bubble plates 73 are positioned above the nozzle, each comprising upwardly directed necks 74 and heads 75 seated on the plates about the necks and having toothed lower edges 76 through which the vapors pass to relief at the top of the tower.

One advantage gained with my method is that the non-condensible gases passing through the shower of charging stock are adsorbed in the latter and recovered along with the condensible vapors, thereby saving a great proportion of this useful component which would be lost if allowed to pass freely from the tower.

Particular attention is called to the steps whereby straight run vapors and vaporous products of cracking are blended, liquid levels in expansion zones are avoided, and reflux condensates and charging stock are blended and passed through a liquid seal to conserve the hydrogen and reduce the percentage of carbon in spent oils, for circulation through the cracking still.

Unvaporized portions of the charging stock are blended with vaporous products of cracking in the vaporizer 7 and pass to the bottom of the separator 11 to form a pool or liquid seal, pressure in the separator 11 being substantially at atmosphere. The composite cracking stock is withdrawn from the pool in a manner to maintain the level of the pool so that the cracking stock will move from the vaporizer 7 to the cracking still substantially without expansion or loss of vapors.

The level of the pool may be controlled by the speed of the pumps and also by delivering additional supplies of oil from the supply tank 63.

The components of the pool act as an absorbing unit to materially lessen the losses of uncondensible vapors. The spent oils that have passed one or more times through the system are blended with the incoming charging stock so that they are reconditioned and built up. The percentage of hydrogen in recirculated cracking stock is materially increased and the percentage of carbon is materially decreased.

Cracking stock heated to approximately 890° F. under 250 to 300 lbs. of pressure is delivered downwardly into the lower end of the cracking tower 25, the tower being maintained full of liquid under pressure, whereby all the oil must move over substantially the length of the tower to the outlet at the top thereof and the temperature of the liquid is lowered 50 to 100° F.

The secondary cracking tower is maintained full of vapors and at a temperature above the final boiling point of the charging stock. The low pressure expansion zone is proportioned to the stream of vapors, and pressure of approximately 5 lbs. is maintained therein so that 2 to 4% of the stream will be condensed, and thus only the heavier hydrocarbons will be converted to liquid form. The liquid is withdrawn under restricted flow to limit the level in the separator 31 and to comprise fuel oil of zero cold test and low gravity, for example, gravity 6 to 8.

I have not attempted to describe every detail of structure embodied in the apparatus, such as gauges and the like, as this is ordinary equipment, and the method may be used with other apparatus.

It is apparent, therefore, that I have provided a method whereby various treatments of oils for the recovery of gasoline may be effected, the selection of modes of operation being optional, and with which the treatments described may be effected with a material saving in labor and fuel.

What I claim and desire to secure by Letters Patent is:

1. The method of treating hydrocarbon oil including heating a stream of oil under pressure to cracking temperature, passing the heated stream of oil through a confined column of the hot oil at cracking temperature in a primary cracking zone, maintaining pressure on said column of hot oil to retain the column in liquid state, passing oil from said primary cracking zone to a secondary cracking zone, drawing off liquid from the secondary cracking zone at a rate to prevent substantial accumulation of liquid oil therein, passing vapors from said secondary cracking zone to a vapor zone, controlling flow of vapors to the vapor zone to maintain relatively high pressure in the secondary cracking zone, delivering vapors from the vapor zone to a blending zone, condensing heavier components of said vapors in the blending zone, delivering condensate from the blending zone to a primary separating zone, withdrawing vapors from the primary separator zone, drawing liquid oil from said primary separating zone for supply of cracking stock, and delivering preheated initial charging stock to the blending zone for commingling of vapors and condensate of said initial stock with vapors and condensate of the cracked oil.

2. The method of treating hydrocarbon oil including heating a stream of oil to cracking temperature, passing said heated stream through a body of hot oil supplied by said stream in a primary cracking zone, maintaining the body of hot oil under relatively high pressure to maintain the same in liquid form, passing oil in liquid form from the primary cracking zone to a secondary cracking zone, withdrawing liquid oil from the secondary cracking zone at a rate to prevent substantial accumulation of liquid oil therein, passing vapors from the secondary cracking zone to a vapor zone, restricting flow of vapors from the secondary cracking zone to maintain relatively high pressure in said zone, passing vapors from the vapor zone to a blending zone, controlling flow of vapors from the vapor zone to maintain approximately atmospheric pressure therein, condensing heavier vapors of the cracked stock in the blending zone, drawing off vapors from the blending zone, delivering condensate from the blending zone to a primary separating zone, delivering heated initial charging stock to the system to maintain supply of liquid cracking stock in the primary separating zone, and delivering liquid oil from the body thereof in the primary separating zone for supply of cracking stock.

3. The method of treating hydrocarbon oil including heating a stream of oil to approximately 500° F., discharging said stream of oil into a blending zone, collecting unvaporized portions of said stock in said zone, passing said unvaporized portions of said stock into a body of liquid oil in a primary separating zone, withdrawing liquid oil from the separating zone for supply of cracking stock at a rate to maintain a body of liquid in said zone, heating the cracking stock, delivering the heated cracking stock to a primary cracking zone, maintaining pressure in said zone to retain the cracking zone full of liquid oil, passing liquid oil from the primary cracking zone to a secondary separating zone, taking off vapors and passing them through a vapor zone, removing unvaporized oil at a rate to prevent substantial accumulation of liquid oil in the secondary separating zone, passing vapors from the vapor zone upwardly through unvaporized portions of incoming initial charging stock in the blending zone, restricting outflow of vapors from the vapor zone to maintain a pressure of approximately five pounds per square inch in said vapor zone, drawing off condensate formed from the vapor zone, passing vapors from the blending zone to the primary separating zone to mingle with vapors rising from the body of oil therein, and condensing and collecting the combined vapors from said primary separating zone.

4. A conversion process which comprises heating hydrocarbon oil to cracking temperature under pressure while flowing in a restricted stream through a heating zone, discharging the heated products into the lower portion of a confined column of liquid oil maintained under cracking conditions of temperature and pressure in a vertical reaction chamber, continuously removing oil from the upper portion of said body and subjecting the same to further conversion in vapor phase in a second reaction chamber maintained substantially free of liquid accumulations, separately removing the cracked vapors and residual products from the lower portion of the second chamber and fractionating and condensing the vapors.

5. A conversion process which comprises heating hydrocarbon oil to cracking temperature under pressure while flowing in a restricted stream through a heating zone, discharging the heated products into the lower portion of a confined column of liquid oil maintained under cracking conditions of temperature and pressure in a vertical reaction chamber, continuously removing oil from the upper portion of said body and introducing the same to the upper portion of a second vertical reaction chamber maintained under cracking conditions of temperature and pressure, passing the last-named oil downwardly through the second chamber and subjecting the same therein to further conversion in vapor phase, removing residual products from the bottom of the second chamber at a rate adequate to prevent any appreciable accumulation of liquid in this chamber, separately removing the cracked vapors from the lower portion of the second chamber and fractionating and condensing the same.

6. A conversion process which comprises heating hydrocarbon oil to cracking temperature under pressure while flowing in a restricted stream through a heating zone, discharging the heated products into the lower portion of a confined column of liquid oil maintained under cracking conditions of temperature and pressure in a vertical reaction chamber, continuously removing oil from the upper portion of said body and subjecting the same to further conversion in vapor phase in a second reaction chamber, removing residual products from the bottom of the second chamber at a rate adequate to maintain this chamber substantially free of liquid accumulations and isolating said residual products from the process, separately removing the cracked vapors from the second chamber and introducing the same to a separating chamber maintained under lower pressure than said reaction chambers, introducing relatively heavy charging oil for the process to the separating chamber and vaporizing a substantial portion thereof in this chamber, removing the unvaporized products from the separating chamber and isolating the same from the process, separately removing the commingled cracked vapors and charging oil vapors from the separating chamber and fractionating the same to condense heavier fractions thereof, supplying resultant reflux condensate to the heating zone, and finally condensing the fractionated vapors.

UNIVERSAL OIL PRODUCTS COMPANY,
*Assignee of Edward E. Stewart, Deceased.*
By HIRAM J. HALLE,
*President.*